(No Model.)

W. BIRMINGHAM.
EYEGLASS OR SPECTACLE CASE.

No. 475,995. Patented May 31, 1892.

WITNESSES:
F. Norman Dixon,
J. Howard Morris.

Wm Birmingham
INVENTOR:
By his Attorneys
Wm C. Strawbridge
Bonsall Taylor

UNITED STATES PATENT OFFICE.

WILLIAM BIRMINGHAM, OF PHILADELPHIA, PENNSYLVANIA.

EYEGLASS OR SPECTACLE CASE.

SPECIFICATION forming part of Letters Patent No. 475,995, dated May 31, 1892.

Application filed August 3, 1891. Serial No. 401,602. (No model.)

*To all whom it may concern:*

Be it known that I, WILLIAM BIRMINGHAM, a citizen of the United States, residing in the city and county of Philadelphia, in the State of Pennsylvania, have invented certain new and useful Improvements in Eyeglass and Spectacle Cases, of which the following is a specification.

My invention relates to eyeglass and spectacle cases designed to inclose eyeglasses or spectacles provided with rigid nose pieces projecting from the plane of the lenses, which cases are formed as rigid elongated sheaths or pockets each having, preferably, one of its ends closed and the other open, and one of its sides or faces being flat and the opposite side or face embodying a longitudinal bulge extending from the open end to a point at or beyond its longitudinal center, which bulge constitutes an internal groove for reception of the nose pieces.

When the above named eyeglass case is formed of two pieces of material each of which is of about the same shape as but slightly larger than the side face of the completed eyeglass case, and the edges of which two pieces are secured together in any ordinary manner, it is found in practice that pressure upon that side face of the case which embodies the above mentioned bulge will have a tendency to spread the arch which said bulge in effect constitutes and thereby cause the joint along the meeting edges of the two pieces to open.

It is the object of my present invention to so construct an eyeglass case of the character above set forth that it shall be adapted to resist the pressure upon its bulged face to which it is exposed in practice.

A good form of a convenient embodiment of my invention is illustrated in the accompanying drawings and hereinafter described, the particular subject matter claimed as novel being hereinafter definitely specified.

Figure 1:
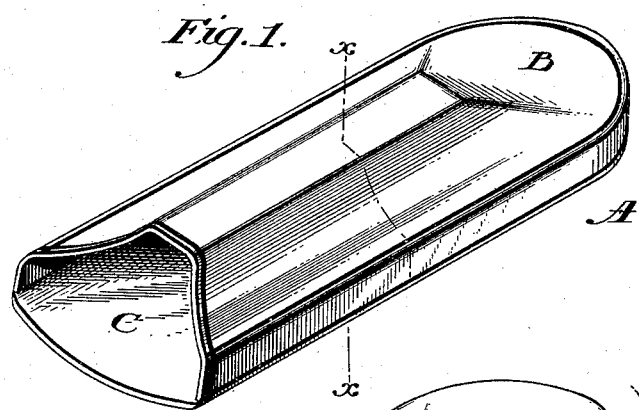
Figure 2:
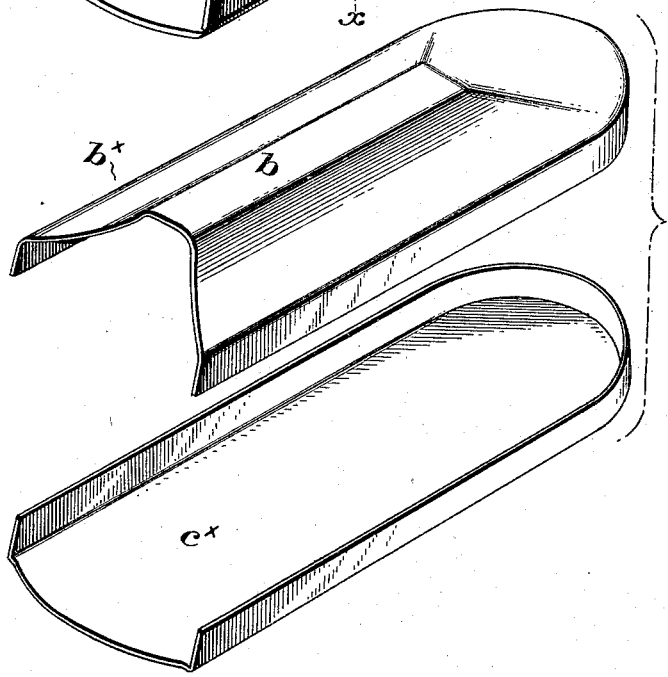
Figure 3:
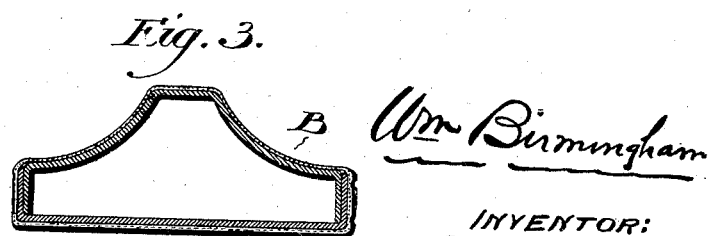

In the drawings, Figure 1 is a view in perspective of an eyeglass case embodying my invention. Fig. 2 is a view in perspective of the two members or halves which are united to form the eyeglass case of Fig. 1. Fig. 3 is a transverse sectional elevation of the case taken on the line $x\ x$ of Fig. 1.

In the drawings, A is the completed case, having the side B embodying the central longitudinal bulge $b$, and the flat side C, as described in the application above referred to.

In constructing my improved eyeglass case I cut out by dies or otherwise from the material from which the case is to be formed two pieces of appropriate shape to form the two sides thereof respectively. These pieces I designate respectively $b^x\ c^x$. By means of a stamp, die, or other shaping instrumentality, I turn up the edge of each piece along three of its sides, the height of such turned up edge being by preference about equal to the thickness of the completed case. The two sides thus provided each with a flange are placed face to face, so that their flanges overlap each other, the flange of the flat side C inclosing the flange of the bulged side B,—and the meeting surfaces of the two flanges are glued, sewed, or otherwise secured together. As will be understood, the eye glass case so constructed will be enabled to resist the tendency to open at the joint occasioned, as explained, by pressure upon the bulged face, by reason of the fact that the flange of the bulged half of the case, which is the portion of the case tending to actually widen or spread away from the edges of the flat half of the case, is inclosed within the turned up flange of the flat half of the case, and therefore such spreading as would occasion opening of the joint is prevented, while, moreover, the completed article, being thus as to its edge of double thickness, possesses great strength and durability. Apart from this feature of advantage, the method of construction referred to is simple, economical, and expeditious.

Having thus described my invention, I claim and desire to secure by Letters Patent:

As an article of manufacture, an eyeglass or spectacle case, being an elongated sheath-like structure having an open end, and having two sides, one of which is flat and the other of which embodies a longitudinal central bulge, the outer edge of the bulged side of the case having a rim formed thereon and contained or seated within and secured to a rim formed on the edge of the other side of said case, substantially as set forth.

In testimony that I claim the foregoing as my invention I have hereunto signed my name this 6th day of May, A. D. 1891.

WILLIAM BIRMINGHAM.

In presence of—
  F. NORMAN DIXON,
  J. HOWARD MORRIS.